United States Patent [19]
Caddell et al.

[11] 3,792,655
[45] Feb. 19, 1974

[54] APPARATUS FOR THE RECOVERY OF BUTTER, OLEOMARGERINE, CHEESE OR THE LIKE

[75] Inventors: Bobby Gene Caddell, Kansas City; Harry E. Gordon, Raytown, both of Mo.

[73] Assignee: Kansas City Enterprises, Inc., Shawnee Mission, Kans.

[22] Filed: Feb. 18, 1972

[21] Appl. No.: 227,478

[52] U.S. Cl................. 100/116, 100/158, 100/210, 99/461, 425/331
[51] Int. Cl............................ B30b 9/06, B30b 3/02
[58] Field of Search... 100/110, 112, 116, 118, 119, 100/120, 121, 122, 123, 91, 210, 158, 139; 99/457, 458, 461, 464; 425/84, 331, 314; 209/361, 235

[56] References Cited
UNITED STATES PATENTS

| | | | |
|---|---|---|---|
| 139,571 | 6/1873 | Golden | 99/461 |
| 1,994,371 | 3/1935 | Sizer | 425/331 X |
| 2,124,744 | 7/1938 | Meakin | 100/210 X |
| 3,016,026 | 1/1962 | Sorensen | 425/331 X |
| 3,125,019 | 3/1964 | Ackerman | 100/158 R X |

Primary Examiner—Peter Feldman
Attorney, Agent, or Firm—Schmidt, Johnson, Hovey & Williams

[57] ABSTRACT

Apparatus is presented for physically separating butter, oleomargerine, cheese or like viscous substance from sheet material carrying the viscous substance as individual "reddies" or equivalent units in order to permit recovery and reprocessing of the substance from improperly formed or packaged reddie units. At least one frustoconical roller drum firmly engages one side of a perforated separator disc and rotates synchronously therewith to squeeze the reddies therebetween and force the butter or like substance through the disc perforations while the sheet material remains on the one side of the disc. The roller removably and adjustably mounts upon a unitary frame carrying the disc into a desired contacting alignment with portions of the disc to create a controlled degree of sliding between the disc and roller for increasing the efficiency of the separating action of the apparatus. A conveyor delivers the reddie units from a collecting hopper to the disc and roller, and substance and sheet material scrapers engage opposite sides of the disc to effect removal of the separated substance and sheet material respectively.

8 Claims, 9 Drawing Figures

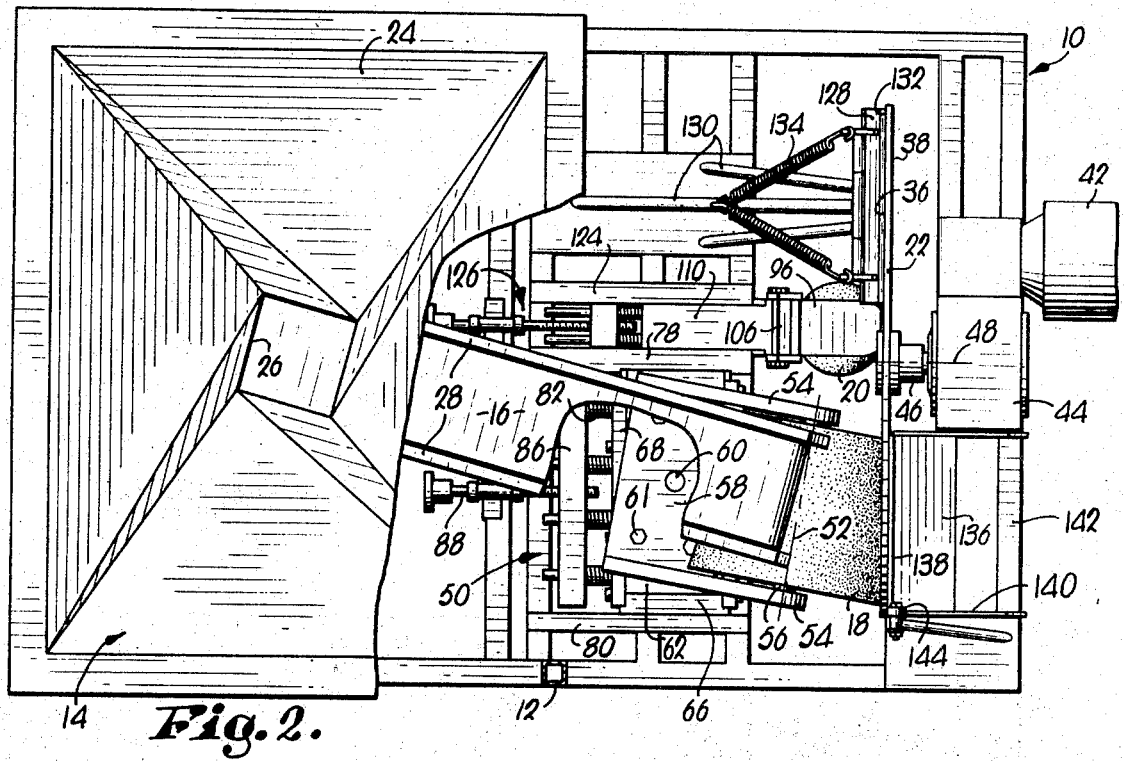

APPARATUS FOR THE RECOVERY OF BUTTER, OLEOMARGERINE, CHEESE OR THE LIKE

This invention relates to apparatus for physically separating butter, oleomargerine, cheese or like substance from sheet material carrying the substance in individual units and upon which the substance removably adheres.

Conventional dairy-processing machinery includes high speed forming and packaging apparatuses which are adapted to form butter or oleomargerine in individually packaged units of desired size and configuration. Typical steps in such forming processes contemplate molding the butter or oleomargerine to the desired configuration, or slicing the butter from a larger block, or even blowing molten butter into the desired form. The butter subsequently passes through a packaging step wherein it is placed in adhering relationship upon a carrying sheet or in a bag. An exemplary finished product of such processing is a butter pattie which is conventionally termed a reddie. Such reddies may comprise a pattie of butter carried upon or between protective sheet material adhering to the pattie.

Regardless of the particular process used, it is necessary that the reddies be presented for marketing as neat, perfectly formed units. Consequently, minor malfunctioning of any of the processing machinery may produce disfigured and therefore nonmarketable reddies. In view of the high-speed operation of the reddie processing, a substantial quantity of butter may be produced in an undesirable shape, though the butter itself has not deviated from its original, edible and otherwise acceptable composition. The butter, therefore, is in a pure, unadulterated and usable state and, if discarded, due only to its deformed configuration, becomes expensive and unnecessary waste.

In the past it has been conventional practice to attempt to recover and recycle the usable butter or oleomargerine from its sheet-carrying material by melting the butter or oleomargerine and then manually skimming off the sheet material. This melting many times adulterates and/or causes a drastic change in the properties of the butter or oleomargerine, leading again to its complete waste. For instance, the melting may cause loss of milk solids and salt from butter, or the butter or oleomargerine may pick up a "paper" taste or change in color. At best, this requires subsequent re-refining of the butter or oleomargerine in order to complete its recovery. This method also often results in recovery of only a very low percentage of the substance.

Similarly to butter or oleomargerine, cheese is often formed and packaged by high-speed machinery through molding, slicing, blowing or equivalent processes wherein a great deal of waste can occur due to improper packaging or disfigurement of the otherwise usable cheese. Cheese-melting recovery processes are, of course, subject to the same general type of drawbacks as butter or oleomargerine melting.

Accordingly, there has been a need for apparatus capable of physically separating butter, oleomargerine, cheese or like substance from sheet-carrying material in a highly efficient manner and without inducing any undesirable alteration of the properties or composition of the substance so that the recovered substance is ready for immediate re-forming, re-molding and re-packaging.

It is the primary object of the present invention to provide apparatus for reclaiming butter, oleomargerine, cheese or like substance from sheet material upon which the substance removably adheres, which apparatus effects physical separation of the substance and sheet material without melting or altering the chemical composition, taste, color, or other properties of the substance so that the substance may be recycled without any intermediate remixing or refining or the like.

Another important object of the present invention is to provide cooperatively rotatable and interengaging presses, one of which is perforated, that compress the individually packaged units to squeeze the viscous substance through the perforated press while the sheet-packaging material remains on the first side of the perforated press in order to efficiently separate the viscous substance and packaging material without melting the former and thereby permit recovery of the substance in usable form.

Another important object in accordance with the preceding object is to provide one press of frustoconical configuration which has an outer surface in engagement with the perforated press to effect substance squeezing and wherein the frustoconical press is positioned relative to the perforated press with the central rotational axis of the frustoconical press extending in diverging relationship to the perforated press in order to effect maximum surface interengagement of the presses along a continuous line spanning the operable portion of the perforated press.

Yet another important object of the invention is to provide a perforated press in accordance with the preceding objects which is of a flat, disc-like configuration and mounted to rotate about its central axis in synchronization with the frustoconical press so that the adjacent interengaging portions of the disc and frustoconical roller, travelling substantially the same surface speeds, cooperate with one another to squeeze the substance through generally axially extending apertures in the rotating disc while the sheet material remains upon the disc surface which engages the frustoconical roller in order to present compact and convenient interengaging pressing means at a separating station, yet which presses have relatively large contact areas capable of handling large quantities of the substance.

Another important object of the invention is to provide means for adjustably positioning the frustoconical roller in desired interengagement with the perforated disc in a position creating slight sliding action of controllable sense and degree between the presses during their cooperative rotation in order to create a more efficient substance separating action, as well as loosen the sheet material from its adhering engagement with the perforated disc surface without smearing, in order to facilitate subsequent easy removal of the sheet material from the perforated disc.

A further object in accordance with the preceding object is to provide mounting means which position the rotational axis of the frustoconical roller in nonintersecting relationship with the central rotational axis of the perforated disc in order to create the slight sliding action between the frustoconical roller and perforated disc.

Another important object of the present invention is to provide a frustoconical roller of the type described which is removably mounted upon the frame carrying the perforated disc in a manner permitting easy removal of the frustoconical roller to allow thorough cleaning of the roller.

Another object of the present invention is to provide a frustoconical pressing drum in interengagement with a perforated, rotating separating disc, and spring means for biasing the roller into firm engagement with a receiving surface of the disc in order to assure continuous, firm contact with the separator disc at all times and in a manner compensating for any warpage or nonflat characteristics of the separator disc-receiving surface.

These and still other objects and advantages of the present invention are specifically set forth in or will become apparent from the following detailed description of a preferred embodiment of the invention and accompanying drawings, wherein:

FIG. 1 is a side elevational view of apparatus constructed in accordance with the present invention;

FIG. 2 is a top elevational view of the apparatus, portions of the hopper cut away to reveal details of construction;

Figure 3:
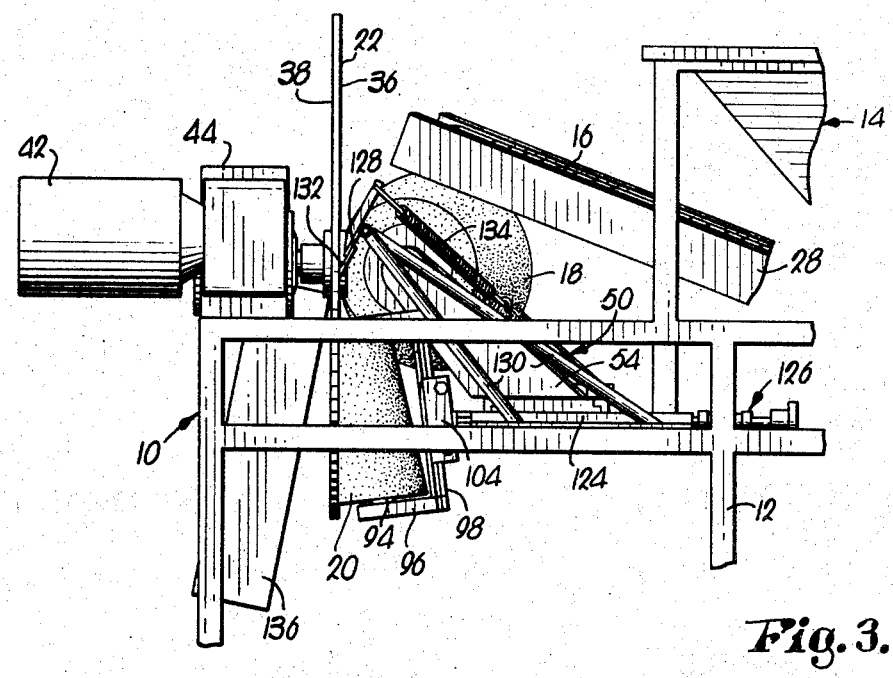
FIG. 3 is a fragmentary, side elevational view of the opposite side of the apparatus.

Referring now more particularly to FIGS. 1–5, the recycling apparatus has a unitary frame, generally referred to by the numeral 10, which comprises a plurality of transversely disposed, firmly interconnected square tubing support members, one of which is denoted by the numeral 12 and shown in cross-section in FIG. 2. Operatively intersecured upon unitary frame 10 at spaced locations are a hopper member 14, a conveyor belt 16, first and second frustoconical rollers 18 and 20, and a pressing disc 22 which engages the frustoconical rollers 18 and 20 at what may be generally referred to as a separating station spaced from the hopper member.

Hopper 14 has inwardly slanting sidewalls 24 for collecting a plurality of reddies or equivalent individual units of viscous substance adhered upon sheet material, and directing same through the open chute 26 at the bottom of the hopper. Any of a number of different forms or configurations of hoppers may be utilized in place of the one illustrated. The hopper feed chute 26 opens adjacent, and directs the individual reddies onto, the inclined conveyor belt 16 which has one end disposed below the hopper and its opposite end disposed above frustoconical roller 18. The conveyor member may also be of any conventional design and differing from the one illustrated which has a pair of side support members 28 whose lower ends are firmly anchored to frame 10 through a baseplate 30. Conveyor belt 16 is of the endless type, looping around an idler pully extending transversely between the upper ends of conveyor side supports 28 and looping about a drive pulley disposed transversely through the lower ends of the conveyor side supports 28. An electric motor conveyor drive 32 operatively couples to the drive pulley disposed at the lower end of the conveyor to propel the conveyor belt 16 along its endless path. A conventional gear reduction unit 34, partially shown in FIG. 1, may be incorporated in the electric drive train if necessary to operate pulley 16 in the desired speed range. Conveyor guide motor 32 is of the variable speed type permitting adjusting of the conveyor belt speed to alter the rate of feed of the reddie units to the separating station.

Figure 4:
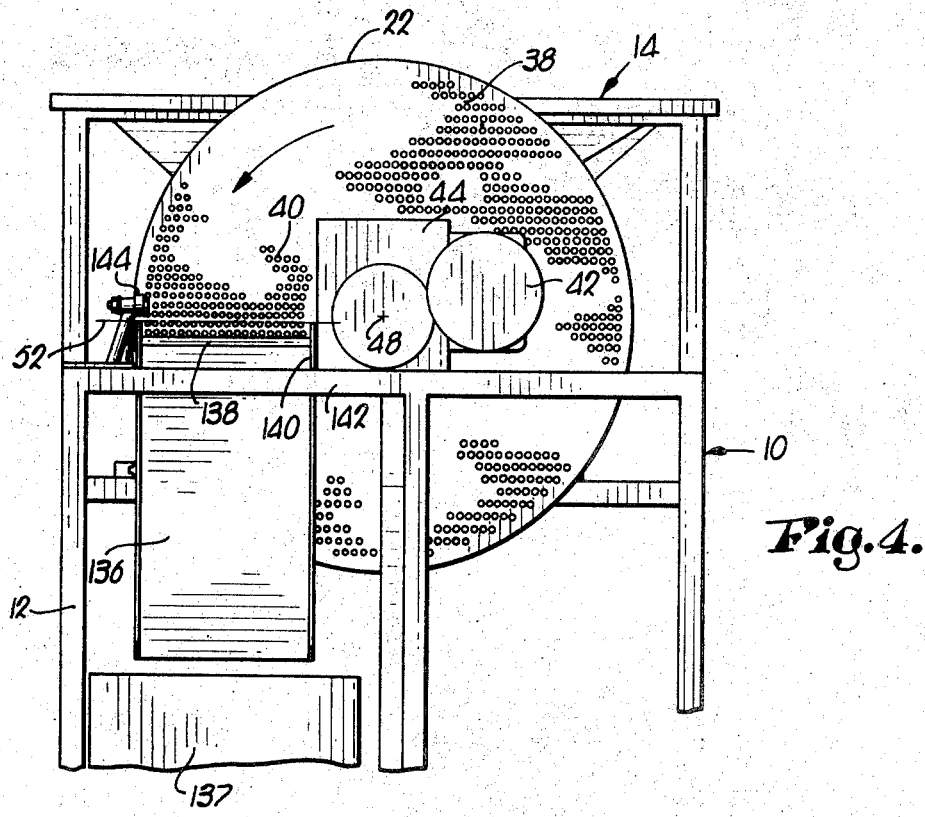
FIG. 4 is a front elevational view of the apparatus.

As clearly illustrated in FIGS. 3 and 4, the separator pressing disc 22 has vertically disposed, parallel and substantially flat, receiving and discharging surfaces 36 and 38. A plurality of axially extending apertures 40 are disposed all along the separator disc to extend between the opposite receiving and discharging surfaces 36 and 38 thereof. Disposed on the discharge side of separator disc 22 and firmly secured to unitary frame 10, is an electric motor drive 42 operatively coupled through a gear reduction box 44 with the central hub 46 of disc 22. Electric motor 42 is also of the variable speed type and is operable to rotate separator disc 22 about its central rotational axis denoted throughout the various figures by the numeral 48.

The axially extending apertures 40 of disc 22 are sized in relationship both to size of the sheet material upon which the butter or like substance adheres, as well as to the possibly brittle nature of such material, to allow flowing of the substance through the apertures while preventing passage of the sheet material therethrough. For instance, it has been found that in operating to separate viscous substance from brittle cellophane sheet material, smaller holes of about ⅛ inch diameter may be included on the disc, while larger holes three-sixteenths inch in diameter or larger, can be utilized when operating with more pliable sheet material. In this respect, the size of apertures 40 are determined primarily in relationship to the brittleness of the sheet material since smaller holes are less likely to cause breakage of the sheet material into parts sufficiently small in size to pass through apertures 40. Other factors which may affect the hole sizes include the viscosity of the substance to be separated from the sheet material. Apertures of varying sizes may be included upon the same disc 22 to make most efficient use of the area of surfaces 36 and 38, i.e., provide the greatest total area of hole openings in keeping with the separating action of the disc.

The larger frustoconical roller 18 is adjustably and removably secured to the unitary frame 10 by mounting means generally referred to by the numeral 50. Roller 18 is affixed upon mounting means 50 so as to rotate about a central axis 52 of the roller 18. As best shown in FIG. 2, roller 18 is normally mounted relative to frame 10 with its central rotational axis 52 in diverging relationship with the disc-receiving surface 36. In the preferred form, roller 18 is positioned so that its rotational axis 52 extends, FIG. 5, in nonintersecting relationship with central disc axis 48. Roller central axis 52 is disposed horizontally, and therefore parallel to the horizontal disc axis 48, but offset slightly below the disc axis. It will be apparent that the frustoconical roller 18 engages successive, concentric radial portions of the disc-receiving surface 36 primarily along a line which is the projection of roller rotational axis 52 upon receiving surface 36, such line contact accordingly extending in nonintersecting relationship with disc rotational axis 48. The actual contact between roller 18 and disc 22 will, of course, be in an area centered about the projection line of roller axis 52 upon surface 36. The width of this area will be determined by the compressiveness of the roller outer surface, along with the magnitude of the force urging the roller into engagement with the disc surface 36. For brevity and the sake of explanation, this area of contact between the roller and disc will be referred as contact line that is the projection of the roller axis 52, though it will be understood that the contact area can be of substantial width.

The mounting means 50 associated with frustoconical roller 18, includes a pair of parallel, upstanding and inclined support arms 54 which have a pivot pin 56 disposed at their outer ends for rotatably carrying frustoconical roller 18. Arms 54 rigidly affix upon a horizontal swivel plate element 58, shown in detail in FIGS. 6 and 7, to which is threadably secured a depending pivot pin 60. Pin 60 pivots within a close fitting aperture of a swivel base element 62 disposed below and in juxtaposed relation to swivel plate element 58. Swivel plate 58 has one or more ring-shaped runner surfaces 64 on the lower surface thereof which engage the adjacent upper surface of swivel base 62 in a manner permitting pivoting of the swivel plate 58 and attached pivot pin 60 relative to swivel base 62 to accordingly pivot frustoconical roller 18 relative to the plane containing the receiving surface 36 of disc 22. Roller 18 is thereby positionable in contacting alignment with disc-receiving surface 36 along a continuous line extending across adjacent radial portions of disc-receiving surface 36. Upon pivoting swivel plate 58 to proper, desired alignment, set screws 61 can be tightened down upon the upper surface of base 62 to frictionally secure plate 58 in fluid relationship to the lower base 62.

Swivel base 62, in turn, rigidly securable upon a lower baseplate element 66 by means of a pair of mirror-image hold-down bars 68. Hold-down bars 68 have guide portions 70 at their upper ends that fit within correspondingly formed and cooperating outer edges of swivel base 62. Horizontal set-screws 72, one of which is shown in FIG. 6, firmly secure the hold-down bars 68 to baseplate 66 in order to rigidly hold swivel base 62 in fixed relationship with baseplate 66. Upon loosening screws 72 to release the firm frictional intersecurement of hold-down bars 68 with swivel base 62, the latter along with the coupled swivel plate 58 and frustoconical roller 18, may be slipped horizontally as viewed in FIG. 5, in a generally radial direction with respect to the disc. Swivel base 62 may be completely removed from baseplate 66 to effect complete removal of frustoconical roller 18 from the unitary frame so as to permit thorough cleaning of the roller. When reinserted between hold-down bars 68, swivel base 62 is adjustably positionable relative to baseplate 66 in order to position frustoconical roller 18 in a generally radial direction relative to separator disc 22 and in desired alignment thereto.

Baseplate element 66 is, in turn, adjustably positionable upon frame 10 in an axial direction with respect to disc 22, (leftwardly and rightwardly in FIG. 2). Baseplate 66 includes guide tongues 74 slidable within grooves 76 of adjacent side guide bars 78 and 80. A plurality of compression springs 82 act through left hold-down bars 68 to force baseplate 66 axially toward the disc-receiving surface 36. Each spring 82 is positioned in surrounding relationship to a spring guide pin 84 which extend through cooperating holes in a spring compression plate 86. An adjusting screw mechanism 88 which is firmly anchored upon the unitary frame has an end threadably received by spring compression plate 86. The adjusting screw is rotatable to effect advancement of spring plate 86 rightwardly toward disc-receiving surface 36 to effect compression of springs 82 and increase the bias of the latter in urging the baseplate 66 and entire mounting means 50 and coupled frustoconical roller 18 into firm engagement with disc-receiving surface 36. Screw 88 may be adjusted to vary the pressure of contact between frustoconical roller 18 and disc-receiving surface 36. The compression springs 82 may be of different compression ratios in order to present an axial biasing force to baseplate 66 which varies across the lateral face of hold-down bars 68. For instance, springs 82 may be sized to present greater pressure at the outer edge of disc-receiving surface 36 than near its central portion.

The other frustoconical roller 20, substantially smaller in size than roller 18, is disposed generally vertically with respect to and adjacent disc-receiving surface 36. Mounting means generally referred to by the numeral 90, adjustably and removably secure roller 20 upon unitary frame in desired contacting alignment with disc-receiving surface 36 so that the central rotational axis 92 of roller 20 extends in diverging relationship with disc-receiving surface 36. Similar to rotational axis 52 of roller 18, axis 92 extends in nonintersecting relationship with central disc axis 48. As can best be seen in FIG. 5, roller rotational axis 92 is disposed slightly leftwardly of a vertical plane containing central disc rotational axis 48. Frustoconical roller 20 interengages with disc-receiving surface 36 along a continuous vertical line which is the projection of inclined axis 92 upon vertical disc-receiving surface 36.

The mounting means 90 associated with smaller roller 20 are functionally similar to the mounting means 50 of the larger roller in that roller 20 may be adjustably positioned axially toward and away from surface 36, generally radially relative to surface 36, and pivotally relative to the vertical plate containing surface 36. In addition, mounting means 90 permit complete removal of roller 20 from the unitary frame 10 for cleaning or other purposes.

Figure 8:
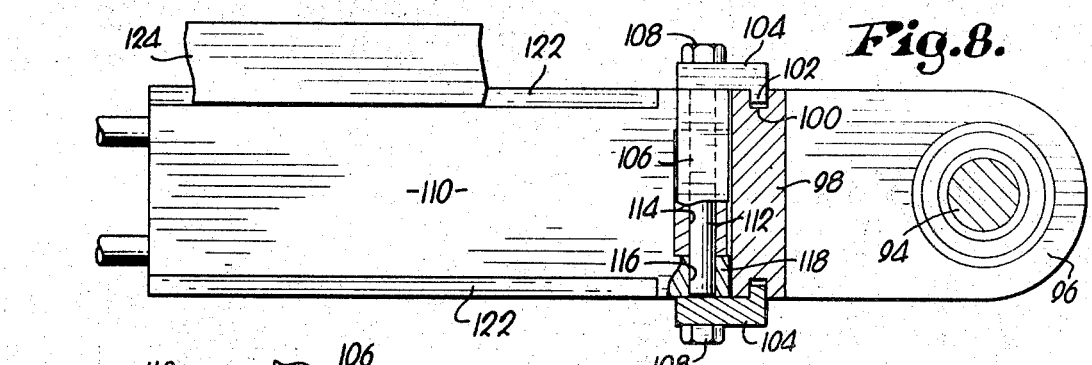
FIG. 8 is an enlarged, offset, horizontal cross-sectional view of the adjustable mounting support means for the vertically disposed frustoconical roller.

A central pivot pin 94 of roller 20 is rotatably carried within apertures of support arms 96 which are secured in generally vertically spaced relationship upon a roller base member 98 that extends parallel to roller axis 92. As clearly shown in FIG. 8, roller base 98 has grooves 100 at its opposite lateral sides for accepting guide tongues 102 of separate clamping plates 104. Setscrews 108 releasably secure the clamping plates 104 upon a hinge base member 106 disposed to extend generally parallel and adjacent roller 20. Upon rigid securement to hinge base 106, the clamping plates 104 clamp and frictionally hold roller base 98 and roller 20 in fixed relationship relative to hinge base 106, while by loosening setscrews 108, the clamping action of plates 104 is sufficiently relieved to permit sliding of roller base 98 upon guide tongues 102 in a vertical or generally radial direction with respect to disc surface 36. Upon loosening setscrews 108 the entire roller base 98 and attached roller 20 may be slipped completely out of engagement with tongues 102 in a downward direction with respect to FIG. 1 to effect complete removal of roller 20 from unitary frame 10.

Figure 9:
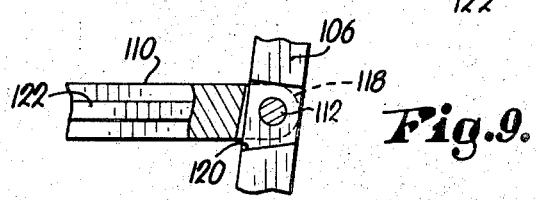
FIG. 9 is an enlarged, fragmentary, vertical cross-sectional view of the pivot connection of FIG. 8.

The hinge base 106 pivotally mounts upon a baseplate member 110 through a laterally extending pivot pin 112 snugly carried within a bore 114 in hinge base 106. Aligned openings 116 in protruding ears 118 on baseplate 110, one of which ears is shwon in cross section in FIG. 8, receive the opposite ends of pin 112 to pivotally affix hinge base 106 to baseplate 110. The hinge base 106 has enlarged notches 120 disposed at its lateral sides to accept and generally surround baseplate ears 118. Notches 120, one of which is shown in detail in FIG. 9, have inclined sidewalls and are sufficiently larger than the corresponding ear 118 so as to permit limited pivotal movement of hinge base 106 relative thereto. This hinge interconnection of hinge base 106 with baseplate 110, permits pivoting of the hinge base 106 and attached roller 20 relative to the vertical plane of disc surface 36 so that the outer surface of roller 20 may be aligned in noninterruptive contact with surface 36.

Similar to the baseplate 66 associated with the large roller 18, the small roller baseplate 110 has side tongues 122 received within cooperating grooves 76 of central guide bar 78 and an outer guide bar 124, which guide bars are anchored upon unitary frame 10. Baseplate 110 is, therefore, slidable upon guide bars 78 and 124 to permit horizontal movement of roller 20 toward and away from disc-receiving surface in an axial direction relative thereto. The relative size and positions of rollers 18 and 20 of the disclosed embodiment permit use of one control guide bar 78 that cooperates with both tongues 74 and 122 associated with the two base plates. As can best be seen in FIG. 2, the small baseplate 110 has at its leftward end an adjusting screw and spring biasing arrangement 126 similar to the adjusting screw 88 and biasing spring 82 arrangement associated with large roller 18. The spring-bias adjusting mechanism 126 operates similarly upon advancement and retreat of its adjusting screw to vary the contact pressure between small roller 20 and disc surface 36.

It will be apparent therefore that the mounting means 50 and 90 incorporate base elements and members which permit linear adjustment of the rollers 18 and 20 in axial and generally radial directions relative to disc surface 36, as well as permitting pivotal adjustment of the rollers relative to surface 36. The mounting means are adjustable upon the unitary frame to which disc 22 is rotatably secured in fixed relationship to create the adjusting movements of the roller relative to disc-receiving surface.

Figure 5:
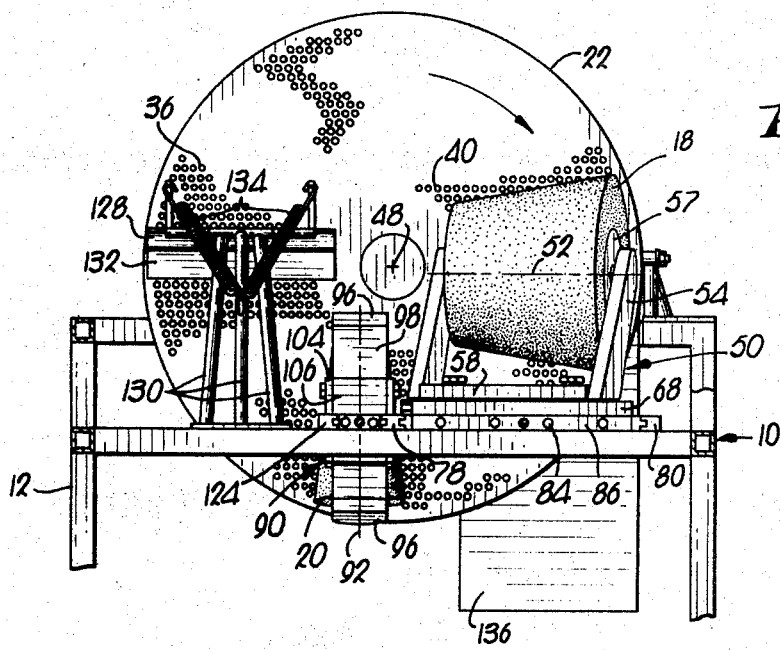
FIG. 5 is a vertical, cross-sectional view taken along line 5—5 of FIG. 1 with the conveyor removed.
Figures 6, 7:
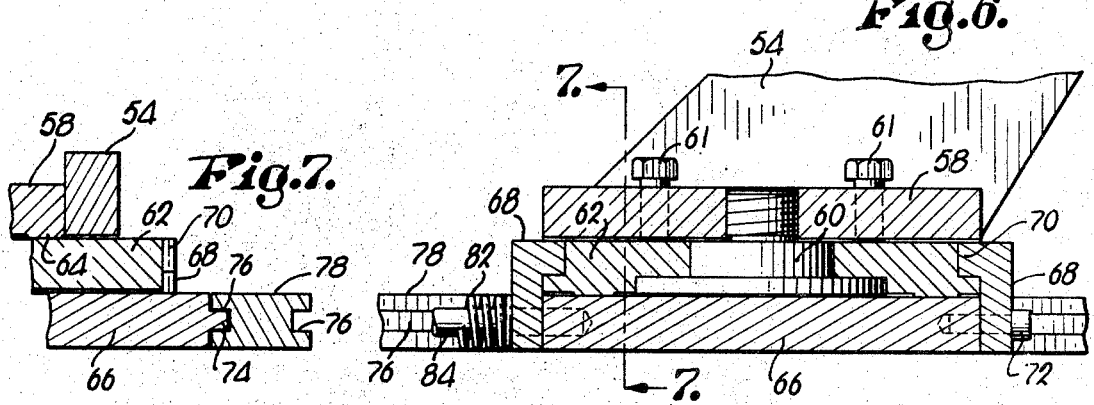
FIG. 6 is an enlarged, generally vertical cross-sectional side view of the adjustable mounting support means for the horizontally disposed frustoconical drum.
FIG. 7 is a transverse, end cross-sectional view taken along line 7—7 of FIG. 6.

The preferred form of the invention further incorporates a sheet material scraper 128 anchored to the unitary frame via a trio of tube supports 130, FIGS. 3 and 5, to which scraper 128 is pivotally attached. A scraper blade 132 is carried by scraper 128 in contacting relationship with disc-receiving surface 36 along a line disposed approximately 180° from the line of contact of roller 18 with surface 36, and accordingly, at 90° to the line of contact of small roller 20 with receiving surface 36. A pair of tension springs 134 extend between scraper 128 and the central tube support 130 in a manner biasing scraper blade 132 into firm engagement with disc surface 36.

Referring now primarily to FIGS. 1 and 4, a substance collecting receptacle 136 hangs upon unitary frame 10 in a location that places a tapered blade edge 138 of the receptacle in engagement with the discharge surface 38 of separator disc 22. Receptacle 136 includes outer ledge portions 140 that lie upon lateral frame support member 142 so that the receptacle may hang by its own weight with its blade edge 138 in engagement with disc discharge surface 38. Receptacle blade edge 138 engages disc discharge surface 38 along a horizontal line extending generally radially relative to the disc at a position disposed slightly below the position of interengagement of the large roller 18 with the opposite side of disc 22. Accordingly, a particular aperture 40 of disc 22 will first cross interengagement with roller 18 before crossing receptacle blade 138 upon rotating disc 22 counterclockwise as viewed in FIG. 4. Receptacle 136 is easily removable from the frame simply by lifting it upwardly as viewed in FIG. 1.

The unitary frame also carries a reaction support roller 144 disposed on the discharge side of disc 22 and in rolling engagement with disc 22 near the outer periphery thereof. Support roller 144 acts in opposition to the compression forces exerted upon disc 22 by the frustoconical rollers 18 and 20 and scraper 128 to minimize cocking of the disc.

In operation, a plurality of reddies or like individually packaged units of viscous substance such as butter, oleomargerine, or cheese are dumped into the hopper 14 to be fed in a substantially continuous stream by conveyor belt 16 to the separating station. Motor 42 rotates disc 22 in a clockwise direction as viewed in FIG. 5 (counterclockwise as viewed in FIG. 4) which in turn cooperatively drives rollers 18 and 20 in synchronous rotation about their respective axes 52 and 92, roller 18 rotating in a clockwise direction as viewed in FIG. 1 and roller 20 rotating counterclockwise as viewed in FIG. 2. The reddies delivered to the upper end of conveyor belt 16 drop onto rotating frustoconical roller 18 and continue between the interengaging disc and roller. The roller 18 and disc cooperate to compress the reddies and squeeze the substance off of the sheet material and through disc apertures 40 to the opposite side of disc 22 at discharge surface 38, where the sheet material remains in adhering relationship upon disc receiving surface 36. The outer surface of frustoconical rollers 18 and 20 are preferably formed of somewhat resilient rubber material in order to preclude adherence of either the sheet material or the substance thereupon. Conversely, separator disc 36 is preferably manufactured out of a stainless steel material to which the sheet material will slightly adhere in order to effect transportation of the sheet material from the large roller 18, to the small roller 20 and then to the scraper blade 132.

Successive zones of the disc receiving surface 36 continue from roller 18 on around into engagement with the smaller frustoconical roller 20 whrein further squeezing action is effected. Though the apparatus functions as well with only one roller 18, inclusion of the second frustoconical roller 20 has been found to greatly facilitate the separaton action, essentially wiping dry the receiving surface 36 and at the same time loosening the sheet material adhered thereupon. After the successive zones of receiving surface 36 leave interengagement with the second roller and proceed to the paper scraping station, the scraper blade 132 will sequentially contact the successive zones of receiving surface 36 to scrape and remove the sheet material therefrom. The paper-loosening action of the second roller 20 greatly enhances the subsequent scraping action of blade 132.

The viscous substance, after being squeezed through apertures 40 to discharge surface 38, will promptly come into contact with receptacle blade edge 138 which scrapes the substance from discharge surface 38 and directs same into the body of receptacle 136. It will be apparent, therefore, that the frustoconical rollers cooperate with disc 22 to separate the viscous substance from its sheet carrying material onto opposite sides and surfaces of the disc, and subsequently direct the substance and sheet material along separate discharge paths on opposite sides of the disc. The apparatus has been found to be highly efficient in its separating action, recovering an extremely high percentage of the substance fed into the hopper, and completely separating the substance from the sheet material. The apparatus is quite reliable in operation and is capable of performing efficient separation regardless of the disarrayed manner in which the reddies may fall upon frustoconical roller 18. In particular the reddies may be presented in stacked relationship with sheet material adhered upon either side thereof, whereupon the interengaging roller and disc are still effective in completely separating the sheet material and butter. The apparatus has been found quite usable in separating viscous substance from even bag-type packaging material which may enclose the viscous substance.

The frustoconical rollers 18 and 20 each comprise a frustoconical rubber roller member firmly affixed upon a support cylinder 57, with the taper of the frustocone being coordinated with respect to the size of separator disc 22 in order to assure that interengaging portions of the disc and rollers rotate at substantially equal instantaneous tangential velocities. The tangential velocity of any given point upon the disc varies in relation to the radial distance of that point from the rotational axis 48, and the frustoconical rollers are sized to create a corresponding tangential velocity gradient across their surface to assure coordinated rotation of the disc and rollers.

Pure rolling interengagement of the rollers with disc receiving surface 36 may be created by positioning the rollers with their central rotational axes intersecting the disc rotational axis 48. The rollers will engage the disc along a radial disc line emanating from axis 48, and each point upon the outer surface of each frustoconical roller will travel at an angular velocity equal to the angular velocity of the adjacent interengaging point upon the disc plate 22. The rollers will not slide at all upon disc receiving surface 36 and pure axial squeezing action will be exerted upon the reddies.

In the preferred form of the invention the roller rotational axes 52 and 92 are deliberately offset slightly from intersecting relationship with the disc rotational axis 48 in order to induce a correspondingly slight sliding action between the rollers and disc. Not engaging the disc along a perfectly radial disc line, different points upon the outer surface of the frustoconical rollers will not have angular velocities perfectly matching that of the adjacent portion of the disc, and sliding contact will occur on at least certain points between the disc and each roller. This slight sliding greatly enhances the separating action of the apparatus without inducing any substantial amount of undesirable smearing of the substance upon the disc receiving surface 36.

The frictional adherance between the substance and the paper or other sheet material is easily broken by the sliding action which also loosens the sheet material from firm adherance upon the receiving surface of disc 22 in order to facilitate easier and more complete scraping by material scraper blade 132. The frustoconical drum and disc arrangement is particularly adaptable for use with a viscous, lubricating substance such as butter or cheese since this substance will continually lubricate the interengaging roller and disc surfaces to minimize any friction and heat induced by the sliding action. Yet, due to the pressure contact of the rollers upon the disc surface, along with the nearly pure rolling interengagement therebetween, the disc will drive the rollers in cooperable and synchronous rotation therewith.

By utilizing a vertically disposed, flat disc plate 22 as one of the pressing members, the apparatus of the present invention efficiently utilizes the force of gravity to assist in removing the substance and the sheet material from the plate. Accordingly, the scrapers 132 and 138 may be of quite simple configuration.

Frustoconically configured rollers 18 and 20, in addition to initially permitting use of a flat disc 22 as one of the presses due to the synchronized gradient angular velocity characteristics described above, are particularly suitable for inducing the desirable rolling, but slight sliding interengagement with the disc. The frustoconical rollers present large disc-contact areas so that the apparatus is capable of handling and separating large quantities of the substance desired to be recovered. Being cooperatively rotatable in response to rotation of disc 22, the rollers do not require separate drive means therefor.

The adjustable positioning of the rollers permitted by mounting means 50 and 90 allow quick and easy variance of the amount of sliding action induced between the rollers and disc receiving surface. The apparatus illustrated permits incremental variance of the contacting action from pure rolling engagement to substantial sliding interengagement in relation to the relative positions of the roller and disc rotational axes. As the sliding action increases with further displacement of the roller rotational axes from intersecting relationship with the disc rotational axis, rolling contact decreases and axial squeezing action will become less. The sliding action of either roller 18 or 20 may be varied as desired by adjusting their positions upon disc 22 to maintain maximum operating efficiency. Further, optimum separation and recovery can be achieved for various substances which may be desired to be separated. The sliding action may also be altered by changing the size of the frustoconical rollers relative to the size of disc receiving surface 36; however such arrangement will sacrifice ease of adjustment of the sliding action.

The mounting means 50 and 90 also present a straight-forward manner in which the spring biasing and compression force between the interengaging disc and rollers can be varied. Such alteration of compression force may be necessary if the apparatus is to be used for different substances of markedly different viscosity. More viscous substances of course will require greater compression force to effect complete separation, while compression force of less magnitude is desirable when operating with less viscous substance in order to minimize composition change or other objectionable injury. The spring biasing presented by the mounting means 50 and 90 also is important in compensating for any warpage or deviations in the disc receiving surface 36 in order to assure firm, continuous contact between the rollers and disc.

Various modifications and alterations to the apparatus will be apparent to those skilled in the art. Accordingly, the foregoing detailed description of the preferred form of the invention is to be considered exemplary in nature and not as limiting to the scope and spirit of the invention as set forth in the appended claims.

Having thus described the invention, what is claimed as new and desired to be secured by Letters Patent is:

1. Apparatus for recovering butter, oleomargerine, cheese or like substance from sheet material carrying the substance in individual units and upon which the substance removably adheres, comprising:
   means for delivering said units to a separating station;
   cooperatively rotatable and interengaging first and second pressing means at said station for receiving said units therebetween and separating said substance and said sheet material as said pressing means are rotated, said first pressing means being provided with a plurality of apertures extending therethrough, said second pressing means operatively engaging said first pressing means on the unit receiving side thereof;
   means for cooperatively rotating said first and second pressing means to effect said separation, said first and second pressing means being thereupon cooperable to compress said individual units and squeeze said substance through said apertures to the opposite side of said first pressing means while the sheet material remains on said receiving side of the first pressing means, whereby said substance and sheet material are separated and directed along respective substance and sheet material discharge paths respectively located at said opposite and said receiving sides of said first pressing means,
   said first pressing means including a perforated disc operably rotating about a central axis thereof,
   said apertures extending generally axially of the disc between substantially parallel and flat receiving and discharging surfaces on said receiving and opposite sides of the disc respectively,
   said apertures being of a size substantially smaller than the major dimensions of said sheet material,
   said second pressing means including a frustoconical roller positioned with a central rotational axis thereof extending in fixed relationship to said disc rotational axis,
   said frustoconical roller being in contact with said receiving surface of the disc,
   said roller being operable to synchronously rotate with the disc to contact successive zones of said receiving surface of the disc,
   said roller being positioned with its rotational axis extending in nonintersecting relationship with said rotational axis of the disc in inclined relationship with said receiving surface of the disc.

2. Apparatus for recovering butter, oleomargarine, cheese or like substance from sheet material carrying the substance in individual units and upon which the substance removably adheres, comprising:
   means for delivering said units to a separating station;
   cooperatively rotatable and interengaging first and second pressing means at said station for receiving said units therebetween and separating said substance and said sheet material as said pressing means are rotated, said first pressing means being provided with a plurality of apertures extending therethrough, said second pressing means operatively engaging said first pressing means on the unit receiving side thereof;
   means for cooperatively rotating said first and second pressing means to effect said separation, said first and second pressing means being thereupon cooperable to compress said individual units and squeeze said substance through said apertures to the opposite side of said first pressing means while the sheet material remains on said receiving side of the first pressing means, whereby siad substance and sheet material are separated and directed along respective substance and sheet material discharge paths respectively located at said opposite and said receiving sides of said first pressing means,
   said first pressing means including a perforated disc operably rotating about a central axis thereof,
   said apertures extending generally axially of the disc between substantially parallel and flat receiving and discharging surfaces on said receiving and opposite sides of the disc respectively,
   said apertures being of a size substantially smaller than the major dimensions of said sheet material,
   said second pressing means including a frustoconical roller positioned with a central rotational axis thereof extending in fixed relationship to said disc rotational axis,
   said frustoconical roller being in contact with said receiving surface of the disc,
   said roller being operable to synchronously rotate with the disc to connect successive zones of said receiving surface of the disc,
   said second pressing means further including a second synchronously rotating frustoconical roller positioned with a central rotational axis thereof extending in fixed relationship to said rotational axes of said disc and said first-mentioned roller, said second roller being in contact with said receiving surface of the disc and angularly displaced from said first roller to contact said successive zones of the receiving surface of the disc after the latter have been contacted by said first roller upon synchronous rotation of said disc and first and second rollers.

3. The apparatus of claim 2 wherein said second roller is positioned with its rotational axis extending in nonintersecting relationship with said rotational axes of the disc and the first roller and in inclined relationship with said receiving surface of the disc.

4. The apparatus of claim 2, wherein is provided a scraper having a blade positioned in said sheet material discharge path and operable to engage said disc on said receiving surface thereof, said blade being angularly displaced from said first roller, said blade being operable to engage and remove said separated sheet material from said successive zones of the receiving surface of the disc after said successive zones have been contacted by said first and second rollers during rotation of the disc.

5. Apparatus for recovering butter, oleomargarine, cheese or like substance from sheet material carrying the substance in individual dual units and upon which the substance removably adheres, comprising:

means for delivering said units to a separating station;

cooperatively rotatable and interengaging first and second pressing means at said station for receiving said units therebetween and separating said substance and said sheet material as said pressing means are rotated, said first pressing means being provided with a plurality of apertures extending therethrough, said second pressing means operatively engaging said first pressing means on the unit receiving side thereof, means for cooperatively rotating said first and second pressing means to effect said separation, said first and second pressing means being thereupon cooperable to compress said individual units and squeeze said substance through said apertures to the opposite side of said first pressing means while the sheet material remains on said receiving side of the first pressing means, whereby said substance and sheet material are separated and directed along respective substance and sheet material discharge paths respectively located at said opposite and said receiving sides of said first pressing means, said first pressing means including a perforated disc operably rotating about a central axis thereof, said apertures extending generally axially of the disc between substantially parallel and flat receiving and discharging surfaces on said receiving and opposite sides of the disc respectively, said apertures being of a size substantially smaller than the major dimensions of said sheet material, said second pressing means including a frustoconical roller positioned with a central rotational axis thereof extending in fixed relationship to said disc rotational axis, said frustoconical roller being in contact with said receiving surface of the disc, said roller being operable to synchronously rotate with the disc to contact successive zones of said receiving surface of the disc, said roller being selectively movable to permit adjustable positioning of the roller in different axial and radial directions relative to said disc and in different angular directions relative to the plane of said receiving surface of said disc, said roller being thereby adjustable in said axial, radial and angular direction into desired contacting alignment with said receiving surface of the disc.

6. The apparatus of claim 5 wherein is provided resilient spring means operably coupled with the roller for urging said roller toward said receiving surface of the disc.

7. The apparatus of claim 5 wherein is provided a frame; and roller mounting means including a first base element secured to the frame and adjustably movable thereon axially relative to said receiving surface of the disc, a second base element disengageably secured to said first base element and adjustably movable thereon radially relative to said disc, and a third base element pivotably mounted upon said second base element and adjustably pivotal thereupon relative to said plane of the receiving surface of the disc, said roller being rotatably mounted upon said third base element to be adjustably positionable into said desired contacting alignment with said disc in response to said adjusting movements of said first, second and third base elements, said second base element being disengageable from said first base element to permit removal of said roller from said frame.

8. The apparatus of claim 5 wherein is provided a frame; and roller mounting means including first, second and third individually adjustable base members, said first base member being adjustably secured to the frame to be adjustably movable thereon axially relative to said receiving surface of the disc, said second base member being pivotally mounted to said first member to be adjustably pivotal thereon relative to said plane of the receiving surface, said third base member being adjustably and disengageably secured to said second frame member to be adjustably movable thereupon radially relatively to said receiving surface, and said roller being rotatably mounted upon said third base member to be adjustably positionable into said desired contacting alignment with said disc in response to said adjusting movements of said first, second and third base members, said third base members being disengageable from said second base member to permit removal of said roller from said frame.

* * * * *